US009232138B1

(12) United States Patent
Baldwin (10) Patent No.: US 9,232,138 B1
(45) Date of Patent: Jan. 5, 2016

(54) IMAGE STABILIZATION TECHNIQUES (71) Applicant: Amazon Technologies, Inc., Reno, NV (US)

(72) Inventor: Leo Benedict Baldwin, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 66 days.

(21) Appl. No.: 13/908,794

(22) Filed: Jun. 3, 2013

(51) Int. Cl.
*H04N 5/228* (2006.01)
*H04N 5/232* (2006.01)

(52) U.S. Cl.
CPC .................. *H04N 5/23264* (2013.01)

(58) Field of Classification Search
USPC ........ 348/208.99, 208.2, 208.4, 208.5, 208.6, 348/208.7, 208.11; 396/55
See application file for complete search history.

(56) References Cited

U.S. PATENT DOCUMENTS

| 8,068,141 | B2* | 11/2011 | Honjo | G02B 27/646 348/208.11 |
| 8,749,648 | B1* | 6/2014 | Kohn et al. | 348/208.6 |
| 2004/0239775 | A1* | 12/2004 | Washisu | 348/239 |
| 2010/0013937 | A1* | 1/2010 | Washisu | G03B 5/00 348/208.2 |
| 2011/0304738 | A1* | 12/2011 | Murakami | 348/208.4 |
| 2012/0081558 | A1* | 4/2012 | Ogura | 348/208.6 |
| 2012/0262590 | A1* | 10/2012 | Yumiki | 348/208.5 |
| 2015/0042827 | A1* | 2/2015 | Noguchi | H04N 5/23245 348/208.2 |

\* cited by examiner

*Primary Examiner* — Sinh Tran
*Assistant Examiner* — Zhenzhen Wu
(74) *Attorney, Agent, or Firm* — Novak Druce Connolly Bove + Quigg LLP (57) ABSTRACT

Approaches to enable a computing device, such as a phone or tablet computer, to apply electronic image stabilization (EIS) and optical image stabilization (OIS) across their respective ranges of effectiveness. The computing device may include a gyroscope that produces data about the orientation or movement of the device and a filter that filters the orientation data and conveys the filtered data to either the OIS system or the EIS system, depending on the amplitude of the excursion. The filter conveys excursions of a first range of amplitude to be corrected by the OIS system and conveys excursions of a second range of amplitude (the portion that is uncorrected by the OIS) to be corrected by the EIS system.

21 Claims, 7 Drawing Sheets

IMAGE STABILIZATION TECHNIQUES

BACKGROUND

People are increasingly relying on computing devices, such as mobile phones, electronic readers (e-readers) and tablet computers to access a wide variety of functions and information. These types of devices often include one or more cameras capable of capturing images. Conventionally, a user needs to touch a graphical element displayed on the touch screen interface to activate the camera, snap the picture, and so on. However, due the small size of such devices, touching the display screen and/or holding the camera in one's hand while capturing an image (or video) may cause the device to move or shake, thereby shifting or distorting the captured images. For example, when capturing still images, such movements or shaking may introduce blur into the image. Similarly, when capturing video (i.e., sequence of images), the shaking and movement of the hand may cause frame-to-frame jitter, making the video appear jumpy and difficult to view for the user.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the aforementioned and other deficiencies experienced in conventional approaches for capturing images and/or performing image stabilization. In particular, various approaches discussed herein enable a computing device, such as a phone or tablet computer equipped with a camera, to apply electronic image stabilization (EIS) and optical image stabilization (OIS) across their respective ranges of effectiveness.

In various embodiments, the computing device includes a gyroscope or other sensor that produces data about the orientation or movement of the device (i.e., orientation data). In one embodiment, the computing device may further include a filter, such as a digital signal processor (DSP) coupled to the gyroscope, where the DSP filters the orientation data and conveys the filtered data to either the OIS system or the EIS system, depending on the amplitude of the excursion (e.g., movement of the camera due to a user's hand shaking). The DSP (or other filter) conveys data associated with excursions of a first range of amplitude (e.g., amplitude less than 1 degree) to be corrected by the OIS system and conveys data associated with excursions of a second range of amplitude (e.g., the uncorrected portion of movements with an amplitude between 1 degree and 3 degrees) to be corrected by the EIS system. In another embodiment, the excursions covered by OIS can be blocked from correction within the firmware of the EIS system. For example, the EIS system firmware can determine that excursions within the first range (e.g., less than 1 degree) will be handled by the OIS system and selectively only correct for the portions of the excursions that are outside of the first range (e.g., greater than 1 degree) and thus would not be corrected by the OIS system. The blocking could be done based on the OIS specifications, or it could be done based on each system's specific capabilities and calibrated at build time.

Conventionally, electronic image stabilization (EIS) is effective only for video (i.e., sequence of images). EIS shifts the frame of a video within the image to compensate for jitter between sequential frames of the video. To accomplish this, most EIS systems utilize a camera with an image sensor that is slightly larger than what would be required to capture the final video. For example, if the video is to be 1920 pixels by 1080 pixels (e.g., 1080p resolution), the image sensor utilized by the camera could be 2100 pixels by 1200 pixels. The EIS system can use these "extra" pixels outside the border of the visible frame to provide a buffer for the excursions caused by the user's hand shaking or other movement of the device. EIS reframes each shot in accordance to data from either the previous image or from a multi-axis gyroscope so that in the resultant video, sequential images appear aligned and do not jump around frame to frame due to shaking of the equipment, such as hand-held equipment. In other words, if a first frame of the video uses a certain subset of the pixels of the image sensor, and if there is an excursion of the camera, then EIS would select a different subset of pixels of the image sensor to use for the second frame that sequentially follows the first frame in order to compensate for the excursion.

Optical image stabilization (OIS), on the other hand, is effective for both still images and for video. OIS realigns (e.g., adjusts) the camera's optical axis by moving one or more of the camera module, the sensor, and/or the lens, thereby compensating for minor hand shaking or other movement of the device. This can help remove the blur due to camera motion which may occur due to shaking of a user's hand over the longer exposures required at low light levels. OIS is usually more useful under low-light conditions when shutter speeds are longer and the motion blur can accumulate over a significant period of exposure (e.g., at shutter speeds greater than 30 milliseconds). OIS is less useful in brightly lit conditions where shutter speeds are short and no significant motion blur can accumulate within the exposure time.

Frequently, OIS may be more useful than EIS because OIS is capable of removing blur within a single image as well registration errors image-to-image within a video stream. However, OIS usually has a limited range of correction angles for which it is effective (e.g. +/−1 degree), whereas EIS can effectively correct over larger angles if there is sufficient margin in the full frame image versus the delivered video image. It would thus be desirable to utilize both OIS and EIS on a handheld computing device, such as a tablet or mobile phone equipped with a camera. However, simply turning on both a conventional EIS system and a conventional OIS system on the same device would cause over-correction in images (at least over the range of angles for which both are effective independently), thereby resulting in the same net error as no stabilization but in the opposite phase.

Figure 1:
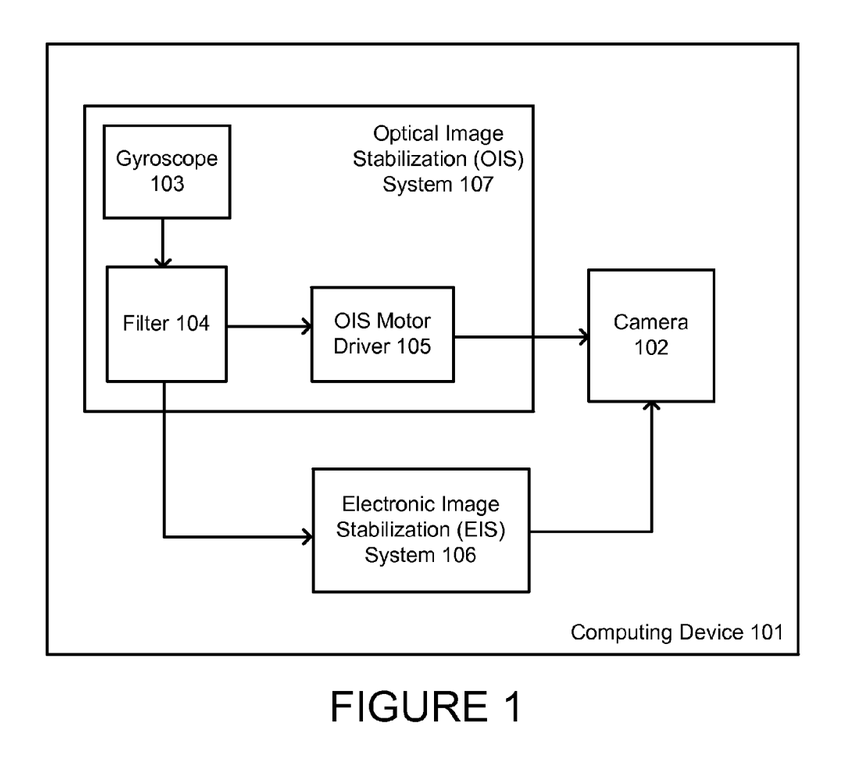
FIG. 1 illustrates an example of a computing device equipped with an OIS system and an EIS system, in accordance with various embodiments.

FIG. 1 illustrates an example of a computing device equipped with an OIS system and an EIS system, in accordance with various embodiments. As shown in the illustration, the computing device 101 includes a camera 102 operable to capture one or more images or video (i.e., a sequence of images). In addition, the computing device 101 includes an optical image stabilization system (OIS) 107 and an electronic image stabilization system (EIS) 106 that are each capable of correcting (i.e., compensating) for excursions of the camera 102 due to movement of the device 101. In particular, the EIS system 106 can shift the frame of a video within the image to compensate for jitter between sequential frames of the video, while OIS can align an optical axis of the camera by physically moving the camera, the image sensor or the lens.

In the illustrated embodiment, the OIS system 107 includes a gyroscope 103 that is capable of detecting movements of the device and producing orientation data about those movements. For example, if the user's unsteady hand causes the computing device 101 to shake slightly (e.g., unintentionally tilting the camera back and forth by approximately 2 degrees), the gyroscope 103 can measure the excursions on the camera 102 caused by the shake and provide the data to an image stabilization system. In particular, as shown in the illustration, the gyroscope 103 can convey the data to a filter 104 that functions similar to a crossover filter. The filter 104 can convey the portions of the frequencies and excursions best suited for correction by the OIS to the OIS motor driver 105, while the portions of the frequencies and excursions best suited to EIS would be directed to the EIS system 106. For example, the filter 104 can convey data about the small amplitude excursions (e.g., excursions less than 1 degree) to the OIS motor driver 105 and convey data about the uncorrected portion of larger amplitude excursions to the EIS system 105.

One possible optimization could be to apply a transfer function where there is a transition zone between the excursion signals. For example, the filter may automatically convey all excursions less than 0.75 degrees to OIS. For excursions between 0.75 degrees and 1.00 degree, a transition zone can be implemented where a progressively larger portion of the correction is transferred from the OIS system to the EIS system. The size of the portions may depend on how close the excursion is to the upper or lower boundary of the transition zone. For example, for those excursions that are closer to 1.00 degree amplitude (e.g., 0.95 degrees), a larger portion of the correction may be dedicated to the EIS system 106 than for excursions closer to 0.75 degrees. The portion of the excursion that is larger than 1.00 degree may then be conveyed entirely to the EIS system 106 to be compensated for.

In various embodiments, filtering of the excursions may be based on the time domain as well as the amplitude domain. OIS system 107 generally has a frequency range that extends from almost 0 Hertz (Hz) to more than 10 Hz, with a peak of around 8-10 Hz. The EIS system 106, on the other hand, may correct according to the frame rates of the camera (e.g., 15 Hz, 30 Hz, etc. depending on the frame rate). If the frequency of the excursion is aligned with the frame rate of the camera 102, that excursion may be a natural candidate for correcting with the EIS system 106. Motions that occur at rates higher than the frame rate, e.g., motions that occur within the frame (within the exposure) may be better suited for correction with OIS system 107. Therefore, for example, if the camera 102 is running at 30 frames per second, any motion with a frequency greater than 30 Hz may be a great candidate for the OIS system 107. The filter 104 may be configured to take into account both the frequency and the amplitude of the excursion when deciding which system (EIS or OIS) to convey the data to.

In various embodiments, the filter may be a digital filter, such as a digital signal processor (DSP), a finite impulse response (FIR) filter, or other dedicated circuitry. In other embodiments, a digital filter that is not running a program may perform the function of separating the excursion signals. In the illustration shown in FIG. 1, the filter 104 is part of the OIS system 107 and is coupled to a gyroscope 103 that would conventionally be used by the OIS system. However, in alternative embodiments, the filter 104 may be implemented separately from the OIS system, as will be illustrated with reference to FIG. 2 described below.

In various embodiments, the electronic image stabilization may be performed by the host processor(s) of the computing device 101. A host processor may be a processor that is responsible for executing the operating system and one or more applications installed on the computing device. Alternatively, the EIS can be performed by one or more processors that are dedicated to performing EIS and are independent of the host processor.

Figure 2:
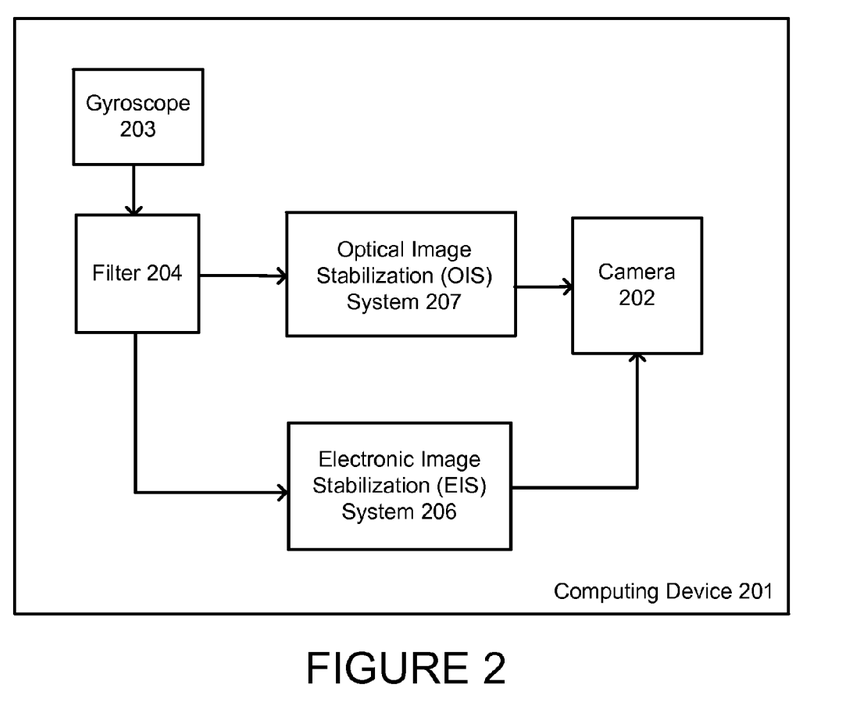
FIG. 2 illustrates another example of a computing device equipped with an OIS system and an EIS system, in accordance with various embodiments.

In various embodiments, the camera 202 may be a rear-facing camera, such as can be found on a tablet computer or a mobile phone. The camera 202 may be operable to capture both still images and video comprised of a sequence of multiple images. In alternative embodiments, the camera 202 may be a front-facing camera or any other camera embedded in the computing device 201 or in communication with the computing device 201. In various embodiments, the computing device 201 may be any device equipped with a camera, including but not limited to a mobile phone, a tablet computer, an electronic reader (e-reader), a dedicated digital camera, a personal digital assistant, a media player (e.g., mp3 player), a laptop, virtual or augmented reality glasses, a smart watch device or the like.

FIG. 2 illustrates another example of a computing device equipped with an OIS system and an EIS system, in accordance with various embodiments. As shown in FIG. 2, similarly to FIG. 1, the computing device 201 includes a camera 202, an optical image stabilization (OIS) system 207 and an electronic image stabilization system (OIS) 206. As previously described, the OIS system 207 may be executed using a dedicated processor and drivers, while the EIS system 206 may be performed using the main host processor of the computing device 201.

In the illustration shown in FIG. 2, the gyroscope 203 is a separate component from the OIS system 207. For example, the gyroscope 203 may be a main system gyroscope having a higher range of detectable motion but lower resolution than a dedicated OIS gyroscope previously described with reference to FIG. 1. Similarly, the filter 204 is shown to be a separate component from the OIS system 207. The configuration illustrated in FIG. 2 may enable a manufacturer of the computing device 201 to use mostly conventional parts (e.g., conventional gyroscope 203, OIS system 207 and EIS system 206) and to implement a custom crossover filter 204 as a separate circuit external to the gyroscope 203.

It should be noted that the configurations of the gyroscope, filter and image stabilization systems shown in FIGS. 1 and 2 are provided purely as examples and are not intended to be limiting to the various embodiments described herein. Various other configurations and implementations will be possible, as will be evident to one of ordinary skill in the art. For example, in some embodiments, rather than implementing a separate filter, the EIS system may simply block the correction of excursions that fall within the range that would be covered by OIS system, as previously described. In these embodiments, the EIS system firmware can determine that excursions within the first range (e.g., less than 1 degree) will be handled by the OIS system and selectively correct compensate only for those uncorrected portion of excursions that are within the second range (e.g., greater than 1 degree). The blocking could be done based on the OIS specifications, or it could be done based on each system's specific capabilities and calibrated at build time. In other alternative embodiments, the filter may be embedded in a gyroscope chip, a driver, an EIS system component or any other component on the computing device.

Figure 3:
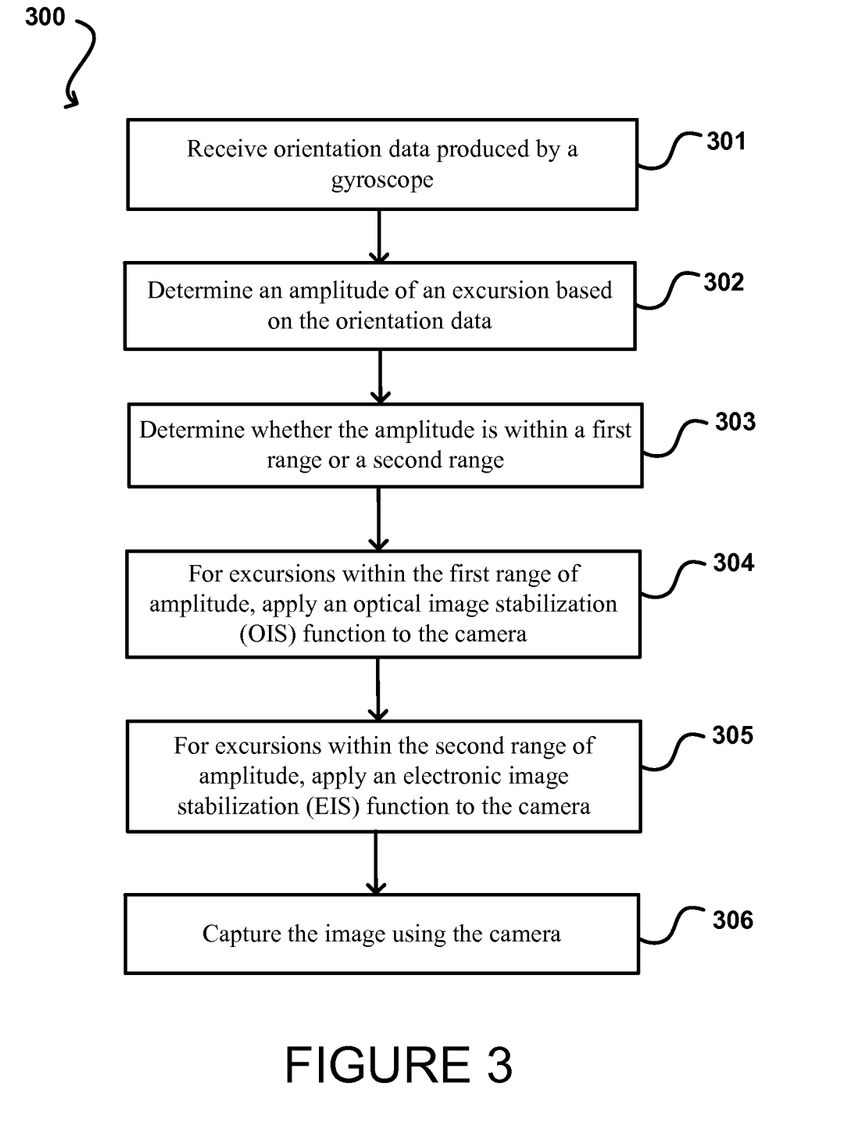
FIG. 3 illustrates an example of a process executed by a computing device equipped with an OIS system and an EIS system, in accordance with various embodiments.

FIG. 3 illustrates an example of a process 300 executed by a computing device equipped with an OIS system and an EIS system, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 301, the filter receives orientation data produced by a gyroscope. The orientation data may provide information about the movement or rotation of the computing device that caused an excursion of the camera. In one embodiment, the filter receiving the orientation data may be a digital signal processor (DSP) embedded in the computing device and having a connection to the gyroscope. In operation 302, the filter determines the amplitude of the excursion based on the orientation data. The filter may determine whether the amplitude is within a first range or a second range, as shown in operation 303. For example, the filter may compare the amplitude of the excursion to a predefined threshold (e.g., 1.00 degree) in order to classify the excursion. If the amplitude of the excursion is less than the defined threshold, the filter may classify the excursion as being within the first range; otherwise if the amplitude is higher than the threshold, the excursion may be classified as being within the second range.

In operation 304, for excursions that fall within the first range of amplitude, the computing device applies the optical image stabilization (OIS) function. For example, the filter may convey the orientation data to the OIS driver embedded in the computing device. The OIS driver may align an optical axis of the camera by physically moving the image sensor, the lens or the camera itself. In operations 305, for excursions that fall within the second range of amplitude, the computing device applies the electronic image stabilization (EIS) function. The EIS function can be executed by a processor of the computing device. EIS can shift the starting point of the image captured by the camera in order to compensate for the offset in the camera that was caused by the excursion. Once the image stabilization has been applied by the computing device (e.g., either EIS or OIS), the camera of the computing device may capture the image.

As previously described, OIS is usually more useful under conditions of low ambient light, when shutter speeds are longer and the motion blur can accumulate over a significant period of exposure (e.g., at shutter speeds greater than 30 milliseconds). OIS is less useful in brightly lit conditions where shutter speeds are short and no significant motion blur can accumulate within the exposure time. OIS also consumes a significant amount of power on the computing device due to the dedicated gyroscope, the drivers and the motors that move either the module or the lens to compensate for device movement.

In order to save power consumption, in various embodiments, the computing device may disable OIS or turn down OIS when photographic conditions are such that the image quality will not benefit, or will only benefit minimally from OIS. These power savings can translate into longer useable time on a single battery charge for the computing device.

Figure 4:
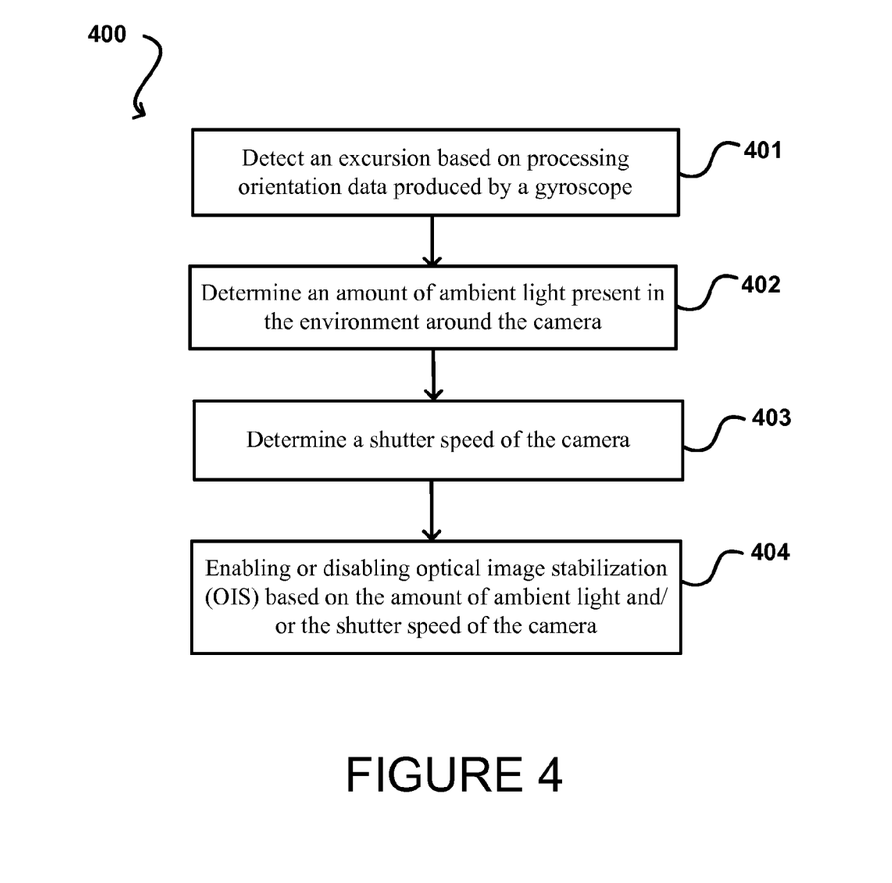
FIG. 4 illustrates an example of a process for enabling or disabling the OIS based on photographic conditions, in accordance with various embodiments.

FIG. 4 illustrates an example of a process 400 for enabling or disabling the OIS based on photographic conditions, in accordance with various embodiments. In operation 401, the computing device (e.g., a processor performing OIS) may detect an excursion based on processing orientation data produced by a gyroscope, as previously described. In operation 402, the computing device may determine an amount of ambient light present in the environment around the camera. For example, the computing device may include one or more sensors configured to detect the amount of ambient light. In operation 403, the computing device may also determine the shutter speed of the camera. The shutter speed or exposure time corresponds to the effective length of time during which a camera's shutter is open. The total duration of light reaching the image sensor is proportional to this exposure time.

In operation 404, the computing device may enable or disable the optical image stabilization (OIS) based at least in part on the amount of ambient light and/or the shutter speed of the camera. For example, if the ambient light is higher than a threshold, the computing device may disable the OIS on the assumption that the camera will not benefit significantly from OIS. Conversely if the amount of ambient light is lower than a threshold, the computing device may enable OIS. Similarly, if the shutter speed of the camera is lower than a threshold, the computing device may disable the OIS, while if the shutter speed of the camera is higher than a threshold, the computing device may enable OIS.

Figure 5:
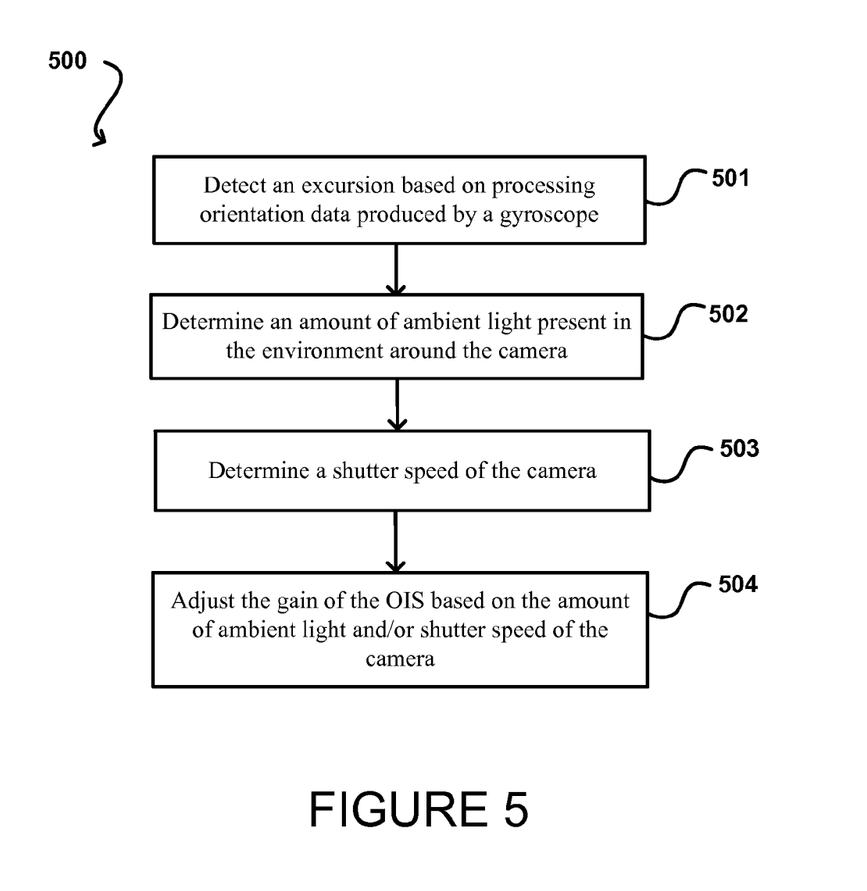
FIG. 5 illustrates an example of a process for adjusting the gain of the OIS based on photographic conditions, in accordance with various embodiments.

FIG. 5 illustrates an example of a process 500 for adjusting the gain of the OIS based on photographic conditions, in accordance with various embodiments. In FIG. 5, similarly to FIG. 4, the computing device may detect an excursion based at least in part on orientation data produced by a gyroscope, as shown in operation 501. The device may then determine the amount of ambient light in the environment (operation 502) and the shutter speed of the camera (operation 503). In FIG. 5, however, the computing device adjusts the gain of the OIS based on the amount of ambient light and/or the shutter speed of the camera. For example, rather than enabling or disabling OIS, the OIS starts out at full gain under the most challenging conditions and as conditions improve, the gain is turned down until the gain is near zero and then device may be turned off (or put into a low power but ready sleep mode). As conditions worsen (e.g., there is less ambient light and/or shutter speed increases), the gain is increased until the gain is full. At full gain, the compensation by the OIS fully corresponds to the motions measured by the gyroscope, while at partial gain, the response is less. The reason to decrease gain rather than just disabling OIS may be to avoid any abrupt changes in image quality.

In some embodiments, the region where gain is modified may be only a small range between where OIS provides an advantage and where there is no advantage or where there is minimal advantage. Additionally, there can be a staged activation of the OIS where in very bright conditions OIS is disabled, in marginal conditions it is enabled but sleeping (e.g., operating in stand-by mode) and under challenging conditions OIS is enabled and operating in active mode.

Figure 6:
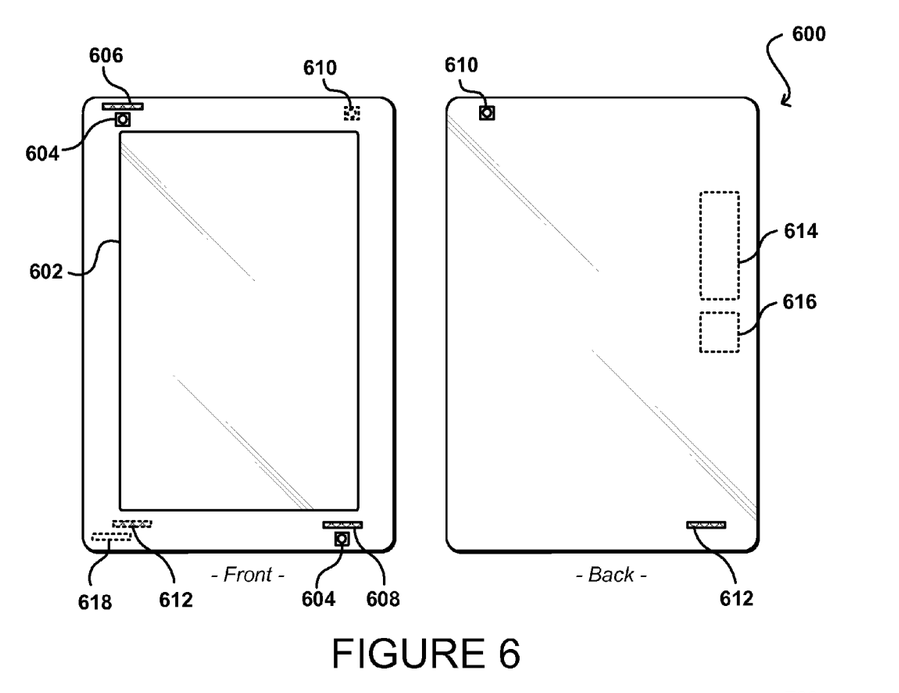
FIG. 6 illustrates front and back views of an example portable computing device that can be used in accordance with various embodiments.

FIG. 6 illustrates front and back views of an example client computing device 600 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others. The client device may have an associated browser width, browser height, as well as various other client-side information associated therewith.

In this example, the portable computing device 600 has a display screen 602 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 610 on other areas of the device as well, such as on the sides or back of the device. While in at least some embodiments a user can provide input by touching or squeezing such a material, in other embodiments the material can be used to detect motion of the device through movement of a patterned surface with respect to the material.

The example portable computing device can include one or more image capture elements for purposes such as conventional image and/or video capture. As discussed elsewhere herein, the image capture elements can also be used for purposes such as to determine motion and receive gesture input. While the portable computing device in this example includes one image capture element 604 on the "front" of the device and one image capture element 610 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology.

The portable computing device can also include at least one microphone 606 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 600 in this example also includes at least one motion or position determining element operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 614, such as may include at least one wired or wireless component operable to communicate with one or more portable computing devices. The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

Figure 7:
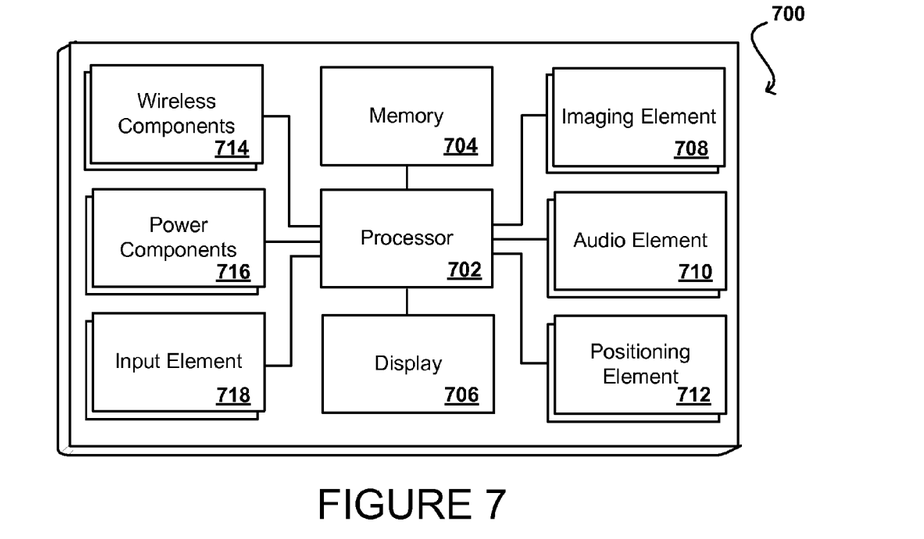
FIG. 7 illustrates an example set of basic components of a portable computing device, such as the device described with respect to FIG. 6.

In order to provide functionality such as that described with respect to FIG. 6, FIG. 7 illustrates an example set of basic components of a portable computing device 700, such as the device 600 described with respect to FIG. 6. In this example, the device includes at least one processor 702 for executing instructions that can be stored in at least one memory device or element 704. As would be apparent to one of ordinary skill in the art, the device can include many types of memory, data storage or computer-readable storage media, such as a first data storage for program instructions for execution by the processor 702, the same or separate storage can be used for images or data, a removable storage memory can be available for sharing information with other devices, etc.

The device typically will include some type of display element 706, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 708, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device.

The device, in many embodiments, will include at least one audio element 710, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one positioning element 712 that provides information such as a position, direction, motion, or orientation of the device. This positioning element 712 can include, for example, accelerometers, inertial sensors, electronic gyroscopes, electronic compasses, and GPS elements.

The device can include at least one additional input device 718 that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 714 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 716 known in the art for providing power to a portable computing device, which can include capacitive charging elements for use with a power pad or similar device as discussed elsewhere herein. The example device also can include at least one touch and/or pressure sensitive element 718, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

Figure 8:
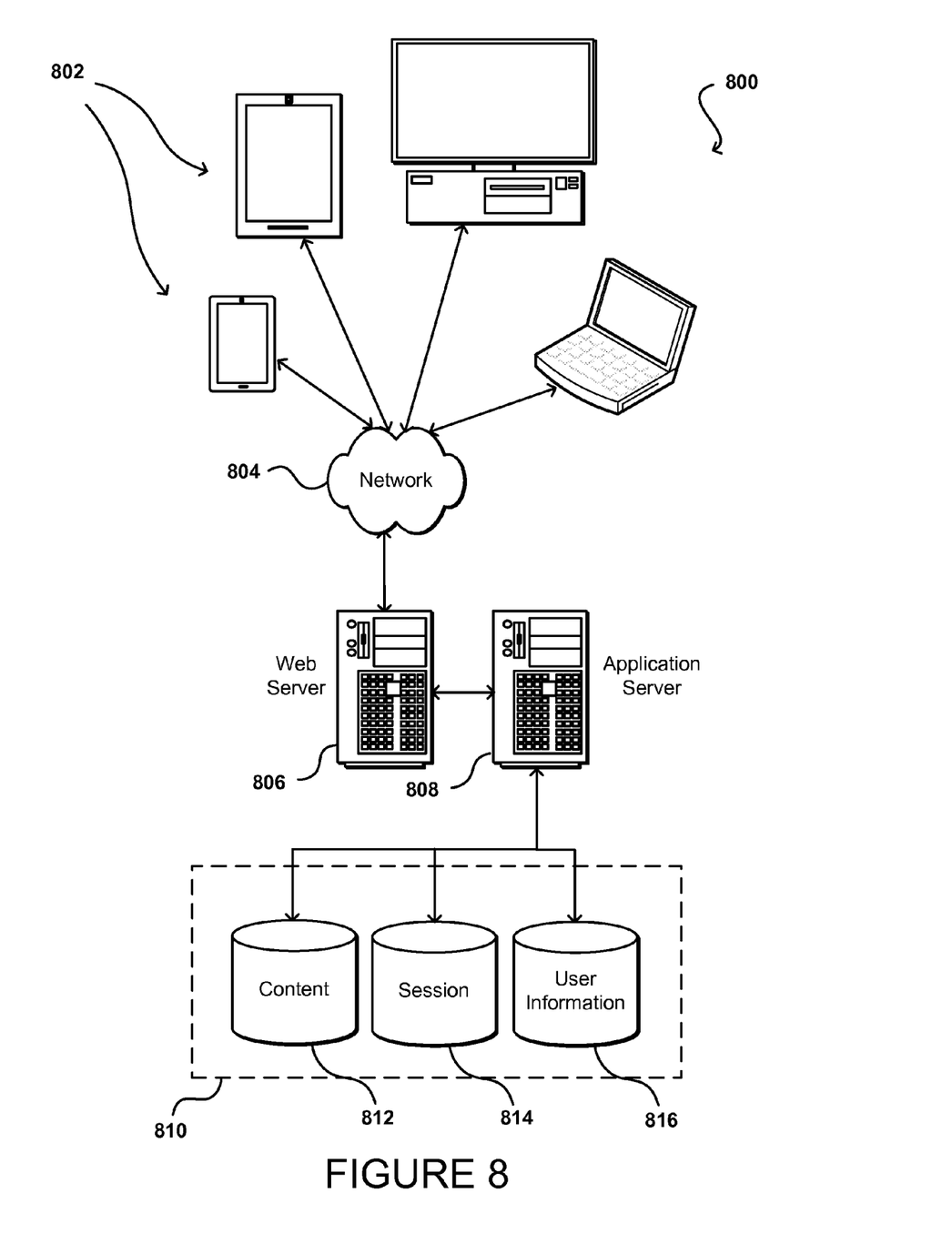
FIG. 8 illustrates an example of an environment for implementing aspects in accordance with various embodiments.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
a gyroscope configured to produce orientation data;
a camera including a lens and an image sensor, the camera operable to capture an image;
an electronic image stabilization (EIS) system operable to shift a frame of a video by selecting a subset of pixels of the image sensor to compensate for jitter between sequential frames of the video;
an optical image stabilization (OIS) system operable to align an optical axis of the camera by physically moving one or more of: the camera, the image sensor, or the lens; and
a filter having connections to the gyroscope, the EIS system and the OIS system, the filter configured to:
receive the orientation data from the gyroscope,
determine that the orientation data corresponds to an excursion with an amplitude;
determine that the amplitude is between a first threshold and a second threshold;
determine a proximity of the amplitude to the second threshold relative to the first threshold; and
apply a transfer function to convey the orientation data to the OIS system to align the optical axis of the camera to compensate for a first portion of the excursion, and convey the orientation data to the EIS system to cause the EIS system to shift the frame of the video within the image sensor to compensate for a second portion of the excursion, the transfer function conveying a progressively larger portion of the excursion to be compensated to the EIS system relative to the OIS system based on the proximity of the amplitude to the second threshold relative to the first threshold.

2. The computing device of claim 1, wherein the filter is a digital signal processor (DSP) that is coupled to a driver of the OIS system and a driver of the EIS system.

3. The computing device of claim 1, wherein the first portion and the second portion are further determined based at least in part on a frequency of the excursion.

4. A computer implemented method, comprising:
under control of one or more computer systems configured with executable instructions,
receiving orientation data;
determining, based on the orientation data, information about an excursion associated with a camera of a computing device, the excursion having an amplitude;
determining that the information about the excursion corresponds to a transition range including a first threshold and a second threshold;
applying a transfer function to compensate for a first portion of the excursion by applying an optical image stabilization (OIS) function to the camera and a second portion of the excursion by applying an electronic image stabilization (EIS) function to the camera, the transfer function conveying a progressively larger portion of the excursion to be compensated to the EIS function relative to the OIS function based on a proximity of the amplitude to the second threshold relative to the first threshold; and
capturing an image using the camera.

5. The computer implemented method of claim 4, wherein the information about the excursion further comprises a frequency of the excursion.

6. The computer implemented method of claim 4, wherein the first threshold is substantially within an effective range of the OIS function and the second threshold is outside the effective range of the OIS function.

7. The computer implemented method of claim 4, wherein the EIS function shifts a frame of a video within an image sensor to compensate for jitter between a plurality of sequential frames of the video.

8. The computer implemented method of claim 4, wherein the camera further includes a lens and an image sensor, and wherein the OIS function adjusts an optical axis of the camera by physically moving one or more of: the camera, the image sensor, or the lens.

9. The computer implemented method of claim 4, wherein the first portion of the excursion is blocked in firmware associated with the EIS function such that the EIS function is not applied to the first portion of the excursion.

10. The computer implemented method of claim 4, wherein the orientation data is produced by a gyroscope embedded in the computing device.

11. The computer implemented method of claim 4, wherein the orientation data is filtered by a digital signal processor (DSP) embedded in the computing device and coupled to a gyroscope, wherein the DSP is configured to:
convey the orientation data to the OIS function; and
convey the orientation data to the EIS function.

12. The computer implemented method of claim 4, wherein applying the OIS function further comprises:
determining at least one of: an amount of ambient light present in an environment around the camera or a shutter speed of the camera; and
controlling the OIS function based at least in part on the amount of the ambient light or the shutter speed of the camera.

13. The computer implemented method of claim 12, wherein controlling the OIS function further comprises:
enabling the OIS function if the amount of the ambient light is less than a defined threshold or disabling the OIS function if the amount of the ambient light is more than the defined threshold.

14. The computer implemented method of claim 12, wherein controlling the OIS function further comprises:
adjusting gain of the OIS function based at least in part on the amount of the ambient light or the shutter speed of the camera.

15. A non-transitory computer readable storage medium storing one or more sequences of instructions that, when executed by at least one processor, cause the at least one processor to:
receive orientation data;
determine, based on the orientation data, information about an excursion associated with a camera of a computing device, the excursion having an amplitude;
determine that the information about the excursion corresponds to a transition range including a first threshold and a second threshold;
apply a transfer function to compensate for a first portion of the excursion by applying an optical image stabilization (OIS) function to the camera and a second portion of the excursion by applying an electronic image stabilization (EIS) function to the camera, the transfer function conveying a progressively larger portion of the excursion to be compensated to the EIS function relative to the OIS function based on a proximity of the amplitude to the second threshold relative to the first threshold; and
capture an image using the camera.

16. The non-transitory computer readable storage medium of claim 15, wherein the information about the excursion further comprises a frequency of the excursion.

17. The non-transitory computer readable storage medium of claim 15, wherein the first threshold is substantially within an effective range of the OIS function and the second threshold is outside the effective range of the OIS function.

18. The non-transitory computer readable storage medium of claim 15, wherein the EIS function shifts a frame of a video within an image sensor to compensate for jitter between a plurality of sequential frames of the video.

19. The non-transitory computer readable storage medium of claim 15, wherein the camera further includes a lens and an image sensor, and wherein the OIS function adjusts an optical axis of the camera by physically moving one or more of: the camera, the image sensor, or the lens.

20. The non-transitory computer readable storage medium of claim 15, wherein the first portion of the excursion is blocked in firmware associated with the EIS function such that the EIS function is not applied to the first portion of the excursion.

21. The non-transitory computer readable storage medium of claim 15, wherein the orientation data is produced by a gyroscope embedded in the computing device.

* * * * *